US006587436B1

(12) United States Patent
Vu et al.

(10) Patent No.: US 6,587,436 B1
(45) Date of Patent: *Jul. 1, 2003

(54) METHOD AND APPARATUS FOR ALLOCATION OF AVAILABLE BANDWIDTH

(75) Inventors: Ken Van Vu, Cary, NC (US); Anoop Ghanwani, Durham, NC (US); Brad Alan Makrucki, Durham, NC (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/977,220

(22) Filed: Nov. 24, 1997

(51) Int. Cl.[7] .......................... H04L 12/28; G01R 31/08
(52) U.S. Cl. ................ 370/236.1; 370/400; 370/395.43
(58) Field of Search ................................. 370/229, 230, 370/231, 232, 233, 235, 236.1, 395, 395.43, 400, 401, 410, 412, 413, 468, 234, 395.2, 389, 241, 253; 709/224, 225, 226, 234, 235, 238

(56) References Cited

U.S. PATENT DOCUMENTS

| | | | | |
|---|---|---|---|---|
| 5,633,859 A | * | 5/1997 | Jain et al. ..................... | 370/234 |
| 5,745,477 A | * | 4/1998 | Zheng et al. ................. | 370/230 |
| 5,754,530 A | * | 5/1998 | Awdeh et al. ................. | 370/232 |
| 5,777,984 A | * | 7/1998 | Gun et al. ..................... | 370/230 |
| 5,784,358 A | * | 7/1998 | Smith et al. .................. | 370/230 |
| 5,864,538 A | * | 1/1999 | Chong et al. ................. | 370/235 |
| 5,905,711 A | * | 5/1999 | Chiussi et al. ................ | 370/232 |
| 5,940,370 A | * | 8/1999 | Curtis et al. .................. | 370/231 |
| 5,940,375 A | * | 8/1999 | Soumiya et al. ............. | 370/249 |
| 5,978,357 A | * | 11/1999 | Charny ........................ | 370/231 |
| 5,991,266 A | * | 11/1999 | Zheng ......................... | 370/229 |
| 5,991,268 A | * | 11/1999 | Awdeh et al. ................ | 370/232 |
| 6,052,361 A | * | 4/2000 | Ansari et al. ................ | 370/232 |
| 6,072,773 A | | 6/2000 | Fichou et al. | |
| 6,075,769 A | | 6/2000 | Ghanwani et al. | |
| 6,084,857 A | * | 7/2000 | Takamichi ................... | 370/236 |
| 6,091,708 A | * | 7/2000 | Matsunuma ................. | 370/233 |
| 6,118,791 A | | 9/2000 | Fichou et al. | |
| 6,141,323 A | * | 10/2000 | Rusu et al. ................... | 370/236 |
| 6,175,570 B1 | | 1/2001 | Cukier et al. | |
| 6,212,181 B1 | | 4/2001 | Divivier et al. | |
| 6,385,168 B1 | * | 5/2002 | Davis et al. ................. | 370/230 |

OTHER PUBLICATIONS

The ATM Forum Technical Committee: Traffic Management Specification Version 4.0, Apr. 1996.

\* cited by examiner

Primary Examiner—Kwang Bin Yao
Assistant Examiner—Hanh Nguyen
(74) Attorney, Agent, or Firm—Cesari and McKenna, LLP

(57) ABSTRACT

A data transfer flow control system for a packet ATM communications system includes a plurality of nodes interconnected by transmission links. Available bandwidth allocation for data packets or cells is improved by defining a Nrm parameter to be the product of an allowable cell rate and a sampling period. Nrm is related to the number of data cells being transmitted between resource management cells in a transmission session, and is set to a number that is independent of round trip times between source and destination nodes, but varying with the allowable cell rate of the source. The allocation fairness problem is solved by normalizing the Nrm value to ensure that the inter-RM cell times for all sessions are fixed at a predetermined time interval. The selection of the predetermined time interval value is a trade-off between network overhead and the responsiveness of the traffic source to network congestion. The predetermined time interval is a function of link speed, buffer size and "burstiness" level of real time traffic sources.

33 Claims, 7 Drawing Sheets

METHOD AND APPARATUS FOR ALLOCATION OF AVAILABLE BANDWIDTH

FIELD OF THE INVENTION

The present invention relates generally to data communications networks and more particularly to an Available Bit Rate (ABR) flow control system for regulating the allocation of available bandwidth within an Asynchronous Transfer Mode (ATM) network.

BACKGROUND OF THE INVENTION

Efficient informational flow control has been an important consideration in the research and design of high speed communications networks. The ATM Forum has recently standardized rate-based flow control for best effort traffic in asynchronous transfer mode (ATM) networks. Flow control processing varies a sender's allowable rate of information transfer in response to feedback from the network within which the information is being transferred. In general, there are two standardized types of transfer, viz. explicit forward congestion indication (EFCI) and relative rate (RR) marking. If a network is not congested, the session's source of the information being transferred is allowed to increase the rate at which the information is sent thereby taking greater advantage of available bandwidth. When slight congestion is detected, the rate is maintained at current value (RR). When more congestion is present, the rate is reduced. Typically the sending rate of a session during which information is being transferred will oscillate around a desired operating level.

A session with a short propagation delay receives and reacts to feedback from the network much faster than a session with a long propagation delay. This is the fundamental reason which causes an unfair allocation of available bandwidth within an ATM network, i.e. closer nodes will be granted bandwidth at a disproportionate rate relative to nodes which are located a greater distance away. The sending rate for an information packet is decreased if one of the nodes along its path is congested. That "greater distance" information transfer is therefore at a disadvantage with respect to sessions traversing a single "hop", or relatively fewer "hops" between source and destination nodes. This results in what is known as a "beat down" problem where long-haul connections are starved.

One solution to this problem has been to use "explicit rate" methods where switches are more intelligent and can compute an estimate of the allowable rate for each session. However, such switches are considerably more complex to implement, especially when the switches are targeted for high speed operation.

Therefore there is a need for an improved methodology for determining and assigning allocations of available bandwidth for data transfers within ATM networks.

SUMMARY OF THE INVENTION

A data transfer flow control system for a packet ATM communications system includes a plurality of nodes interconnected by transmission links. Available bandwidth allocation for data packets or cells is improved by fixing the sampling period and establishing a "Nrm" parameter as the product of an allowable cell rate and the sampling period. The parameter "Nrm" is related to the number of data cells being transmitted between resource management cells in a transmission session, and is set to a number independent of round trip time between source and destination nodes, but varies with the allowable cell rate (ACR).

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
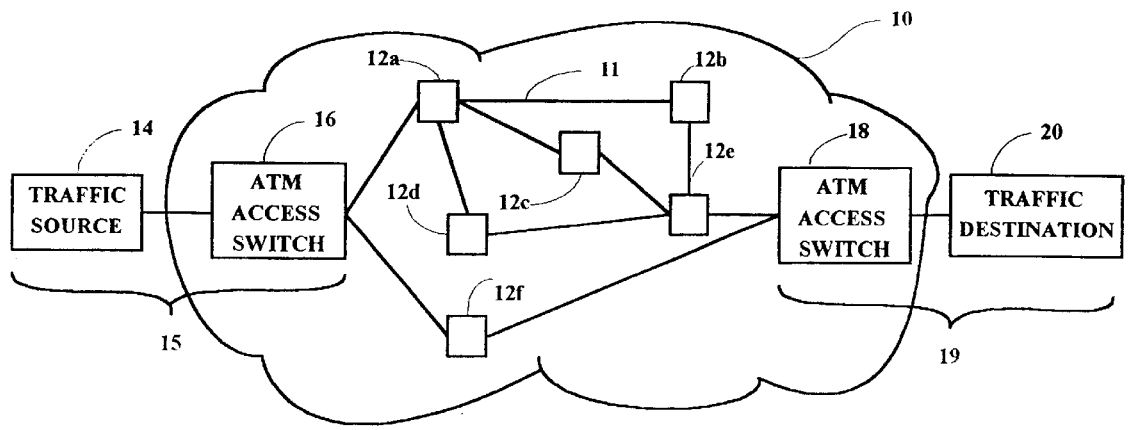
FIG. 1 is a schematic representation of an Asynchronous Transfer Mode (ATM) network within which the present invention may be used.

As shown in FIG. 1, an ATM system is commonly referred to as including a cloud 10, cloud being a term of art that collectively represents the various nodes (communication systems) and links (transmission media) that are within the system. For a particular data path set up between a traffic source 14 and a traffic destination 20, the nodes can be characterized as intermediate nodes, such as nodes 12a through 12f, or endpoint nodes. An endpoint node is either a source or destination system in combination with the hardware and software needed to access the remainder of the ATM network. The combination of traffic source 14 and an ATM access switch 16 is an example of a source endpoint 15 while the combination of traffic destination 20 and an ATM access switch 18 is an example of a destination endpoint 19.

The role (and characterization) of any particular node may change for different network connections. For example, for a different connection, endpoint 19 might either serve as a traffic source or as an intermediate node on a path between two other nodes.

The various nodes are shown as being interconnected by links, such as link 11. The representation of the links is not intended to imply that all of the links are the same. Each link may be any of several known types of media capable of supporting high speed digital traffic, including copper wire, optical fiber or even microwave or satellite wireless links.

Figure 2:
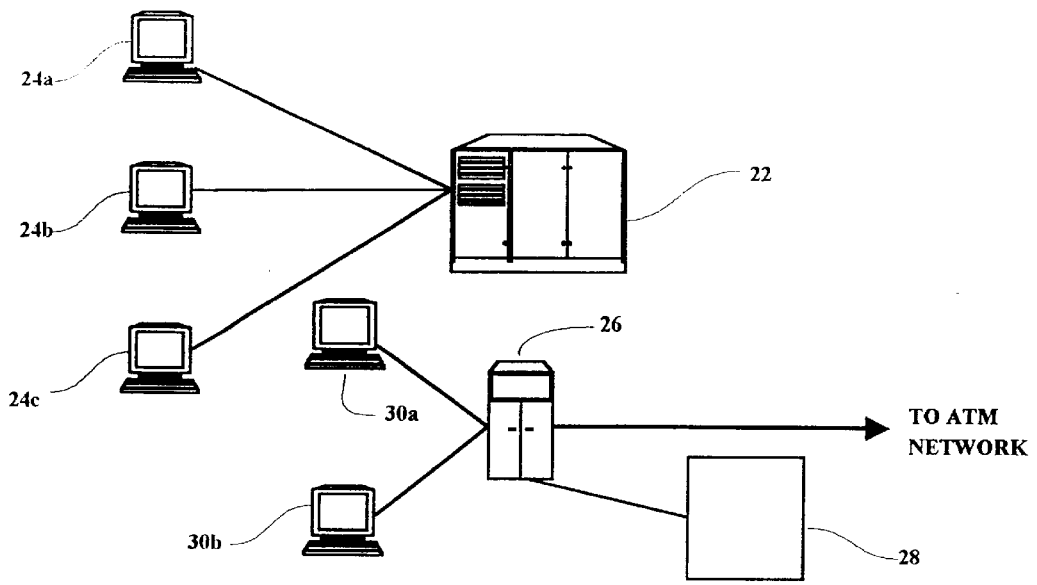
FIG. 2 is illustrative of the kinds of data processing and/or communication equipment which can exist at a node in an ATM network.

FIG. 2 is a more detailed representation of the kind of data processing equipment that might be found at a typical node in an ATM system. The node could include a mainframe 22 with a number of directly connected terminals, such as terminals 24a, 24b and 24c used to support input/output operations for a transaction processing application for example, such as credit verification. The node would also include an ATM access switch 26 connected both the remainder of the ATM network (not shown) and to the mainframe and possibly to a local area network 28 and one or more terminals, such as terminals 30a and 30b, used in a high bandwidth application for example, such as a video-conferencing application. In a given installation, additional controllers or network elements, such as a communication controller or a router, might be part of the system. For example, a router or a communication controller (neither of which is shown) might be interposed between the mainframe 22 and the ATM access switch 26. Similarly, the terminals 24 might be connected indirectly to mainframe 22 through a display controller (not shown).

An ATM access switch can perform a number of functions in a typical system. The access switch may serve to aggregate or concentrate data provided by the various connected components. Also, where the connected components generate data in something other than native ATM cell format, the access switch may perform necessary segmentation/operation/sequencing operations to convert the data from its original format to the standard ATM cell format.

Figure 3:
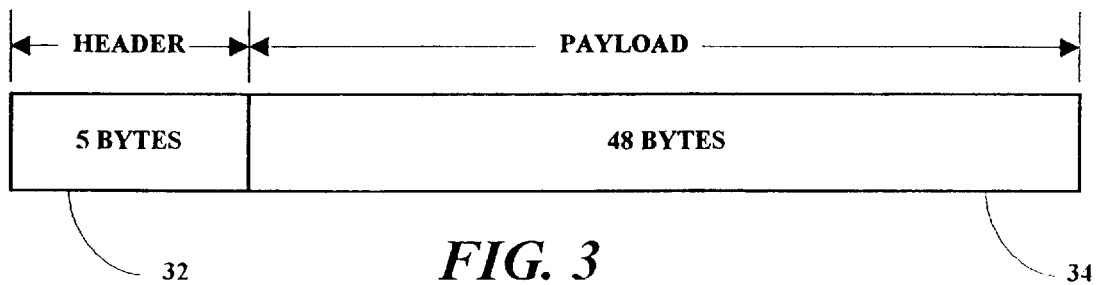
FIG. 3 depicts the overall structure of a standard ATM data cell.

FIG. 3 shows the major elements of a standard ATM cell; namely, a five byte header 32 and a forty-eight byte payload 34. The header 32 contains routing and cell control information. When a connection is set up between two endpoints, the path through the network is defined and is identified by the contents of VPI (Virtual Path Identifier) and VCI (Virtual Channel Identifier) fields in the header. The header further includes a three bit Payload Type Indicator (PTI) field which identifies the cell as a specific type of user data cell or a control cell, such as a Resource Management (RM) cell. A single bit Cell Loss Priority (CLP) field determines whether the cell should be discarded if network congestion is detected. Finally, the header includes a Header Error Correction (HEC) field which can be used to identify a cell having a corrupted header and for cell delineation purposes.

Figure 4:
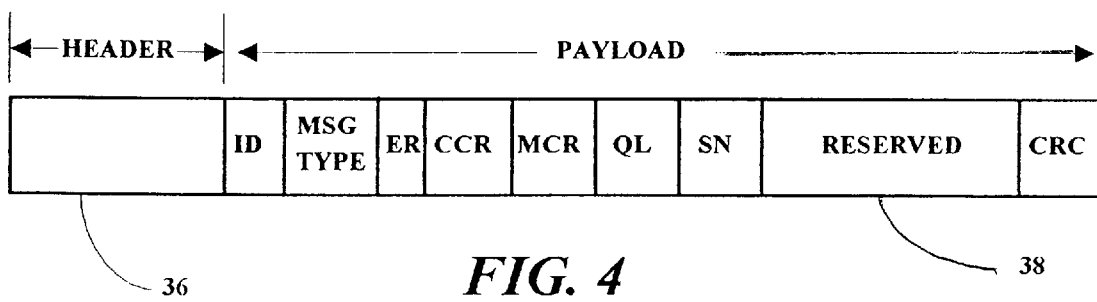
FIG. 4 depicts the fields of a Resource Management (RM) cell, which is a special kind of ATM cell.

A Resource Management (RM) cell is a special ATM cell conforming to the cell structure shown in FIG. 4 and generated by the source every "Nrm−1" data cells where "Nrm", in the present example, is the number of data cells between RM cells. The value Nrm is a constant and is independent of source transmission rate. Like all other ATM cells, an RM cell has a five byte header 36 and a forty-eight byte payload 38. The RM payload, however, is divided into a number of fields, each of which serves a specific function in managing network operation. Table 1 below is a brief description of the fields included in the forty-eight byte payload of an RM cell.

TABLE 1

| NAME | LENGTH | DESCRIPTION |
| --- | --- | --- |
| ID | 1 byte | Identifies the service using the RM cell. |
| Msg | 1 byte | Flow control functions. |

TABLE 1-continued

| NAME | LENGTH | DESCRIPTION |
| --- | --- | --- |
| ER | 2 bytes | Explicit Rate - used in control of source |
| CCR | 2 bytes | Current Cell Rate - current actual |
| MCR | 2 bytes | Minimum Cell Rate - minimum available for |
| QL | 4 bytes | Queue Length - not used for ABR service |
| SN | 4 bytes | Sequence Number - not used for ABR service |
| Res. | 30+ | Reserved. Not currently used. |
| CRC | 1+ | Cyclical Redundancy Check - error correction |

The Reserved and CRC fields are described as 30+ and 1+ bytes, respectively, since one byte in the payload is allocated between six reserved bytes and two bytes which are used in defining a ten bit CRC character.

Figure 5:
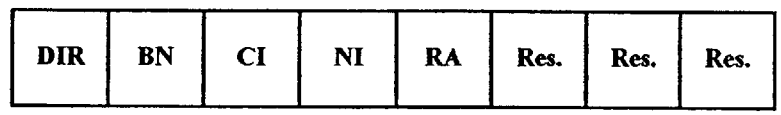
FIG. 5 is an expanded view of the bits in a Message Type field in an RM cell.

FIG. 5 is an expanded view of the subfields of the Msg Type field in the RM cell with each subfield being one bit in length. The content of the DIR subfield indicates the direction of data flow associated with the RM cell. The content of the BN field indicates whether the RM cell is a Backward Explicit Notification Cell (BECN) generated by a destination or intermediate switch. The CI (Congestion Indicator) bit can be set to indicate congestion in the network while the NI (No_increase Indicator) bit can be used to prevent a source from increasing actual transmission rate. The RA bit is not used for ABR service and the Res. bits are, of course, reserved for future implementation of yet-undefined functions.

Figure 6:
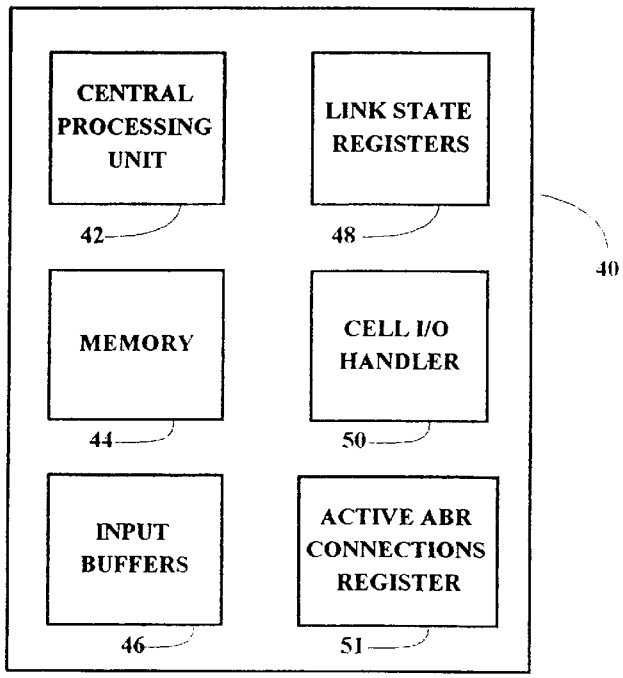
FIG. 6 is a high level view of components of a data processing/handling system which can be used to implement the present invention.

As shown in FIG. 6, a typical general purpose data processing control system 40 would include a central processing unit 42, control and data memory 44, input buffers 46 for temporarily storing cells received from other nodes in the network, link state registers 48 for storing information about the state of various links connected to the system and a cell I/O handler 50 for performing necessary input/output and switching functions. The system would also include a register or set of registers 51 for identifying currently active ABR connections. An active ABR connection is a connection over which at least one RM cell has been received during a current control period. The input buffers serve as cell transfer queues for providing temporary cell storage at the input to the ATM switch. Different queues are used for different classes of ATM traffic although each queue operates on a First-In First-Out basis.

As noted previously, an ABR traffic class was defined in order to permit utilization of network bandwidth when that bandwidth is not being used for CBR or VBR traffic. In determining whether to increase, decrease or leave unchanged ABR bandwidth, the state of the ABR buffer is monitored during each of successive control periods.

ATM networks such as that shown in FIG. 1, are expected to provide support for heterogeneous traffic classes having diverse Quality of Service (QOS) requirements. To this end, four classes of traffic have been defined based on the QOS desired by a session. The four traffic classes, in decreasing order of priority, are as follows. A "Constant Bit Rate" (CBR) traffic class has stringent requirements for both loss and delay. Typically, a peak-rate reservation is made along the path for a given session. Applications that might use the CBR class of service are voice and uncompressed video. A Variable Bit Rate (VBR) traffic class includes slightly less stringent delay requirements. VBR traffic is usually "bursty", i.e. tends to come in bursts, and therefore to improve utilization, a reservation is made which is somewhat less than the peak rate. VBR traffic may be further sub-divided into real-time variable bit rate (rt-VBR) and non-real-time variable bit rate (nrt-VBR), depending on the nature of the delay guarantees required. Compressed video and multimedia email are examples of applications that may use the rt-VBR and nrt-VBR classes of traffic, respectively. Available Bit Rate (ABR) traffic is a "best effort" service class for applications such as file transfer and email. An amount of bandwidth termed "minimum cell rate" (MCR) is reserved for each session. Each session then gets an additional amount of bandwidth depending upon availability. An ABR session is guaranteed a very low loss of traffic to the "allowable cell rate" (ACR) although there are no delay guarantees. An elaborate flow control mechanism is used to maximize network utilization, minimize loss and ensure that sessions share the bandwidth in a "fair" manner. The fourth traffic class is the "unspecified bit rate" (UBR) class, which is also a "best effort" service class, but unlike ABR traffic, with UBR traffic there is no flow control and there are no guarantees for loss and delay.

As hereinbefore noted, in order for an ABR session to perform traffic flow control operations, control cells, called "resource management" (RM) cells, are periodically sent out with the data being transferred. FIG. 4 depicts the fields of a RM cell. Switches along a network path may indicate congestion by modifying fields within the RM cell. The "destination" for the transfer is responsible for turning around the RM cells and sending them back to the source, which then adjusts the rate at which the traffic is sent based upon the feedback from the destination.

Of particular note with regard to the fields within an RM cell, are the "current cell rate" (CCR) field, the "congestion indicator" (CI) field, the "no increase" (NI) indicator field and the "explicit rate" (ER) field. The CCR field is the current cell rate of the session. The CCR field is filled by the source with the "allowable cell rate" (ACR). The CI field is a single bit used as a congestion indicator. If a network element along the path is congested, the element will set the CI bit in the RM cell. A source which receives an RM cell with the CI bit set, will reduce its rate by a predetermined fraction of what it currently holds. The "CI" field is used by the "relative rate" (RR) marking switches only. The NI field is a single bit used as a no increase indicator which may be set by a network element along the path and operating at a desired level of utilization, to indicate that the source should neither increase nor decrease the current rate. The NI field is used by RR marking switches only. The ER field is used only by explicit-rate switches which fill the field with the computed estimate of the allowable rate for a given session.

The NI and CI fields are of interest to the source if any of the switches along a propagation path are either EFCI or RR marking switches. If neither of the NI or CI bits are set, the source increases its rate by a predetermined fixed quantity. Based on the feedback received from the returning RM cells, the source maintains a value of the allowable cell rate or ACR for the session. If the session is to be "in conformance", the sending rate must not exceed the ACR. The ACR is computed by the source based on the NI, CI and ER fields of the returned RM cells.

Explicit forward congestion indication or EFCI is the most basic form of ABR flow control. In this scheme, the switches need not be modified at all. Only the source and destination need modification. The switch does not recognize RM cells. If the switch is congested, the switch will set a combination of bits in the header of the cells to indicate congestion. The destination must save that congestion information. When the next RM cell arrives at the destination, the destination will set the CI bit in the RM cell if the header of the data cells indicated a congested network. With the receipt of every RM cell, the source will increase its rate if the CI bit is not set, and will otherwise reduce its rate.

To support relative rate or RR marking, a switch must be able to recognize RM cells. The switch then has the option of setting NI only or both NI and CI, or neither. If the switch can handle more traffic, it will not set any of the bits and the source will increase its rate. If the switch is operating at a desired utilization, which could possibly be deduced from the queue length for example, it will set NI. When a source receives a cell with the NI bit set but with CI equal to zero, it will simply maintain its current rate. If the switch is congested, it will set the CI bit and the source will reduce its rate when the source receives the RM cell.

Figure 7:
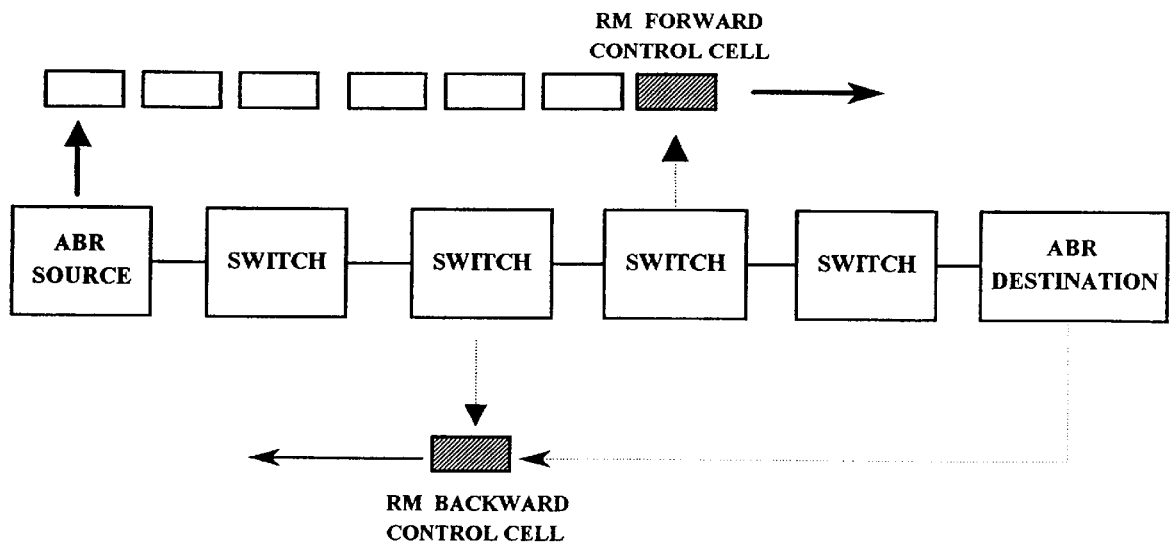
FIG. 7 is an illustration of a typical ATM ABR session during which periodic RM cells are modified by switches along a path of propagation as an indication of network congestion.

As hereinbefore noted, and as illustrated in FIG. 7, an ATM ABR session periodically sends out RM cells which may be modified by switches along a path of propagation as an indication of network congestion. The destination will turn-around the RM cells and send them back to the source and the source then adjusts the source rate based on the feedback received. An RM cell is sent for every (Nrm−1) data cells. Nrm is an ABR parameter signaled at the connection set-up time. It is not negotiable and has a default value of "32". The time between RM cells is a function of the current cell rate i.e. "Nrm" divided by "ACR". A session with a short "round trip time" (RTT) receives and therefore reacts to feedback from the network faster than a session with a long RTT. When bandwidth becomes available, a short RTT session will quickly grab all of the available bandwidth that it needs. While the short RTT session bandwidth is being allocated, a session with a long RTT is still waiting for the network feedback. This results in a quick build-up at the output queue which causes the session with the longer RTTs to maintain or even reduce its current rate.

For example, a network under study may have two sessions sharing a common switch. Session {S1,D1} has a long RTT(1) and session {S2,D2} has a relatively shorter RTT(2). In the example, Nrm(1) equals Nrm(2) and represents the Nrm values in sessions {S1,D1} and {S2,D2}. Initially, the inter-RM cell times for both sessions are equal. Since the feedback from session {S2,D2} return earlier, session {S2,D2} is allowed to increase its ACR sooner. Since Nrm is fixed, as ACR increases, the inter-RM cell time is reduced. The reductions in inter-RM cell times results in an increase in the queue sampling frequency for session {S2,D2}. This has the same effect as to further shorten the RTT(2). This domino effect causes serious fairness problems in bandwidth allocations.

Figure 8:
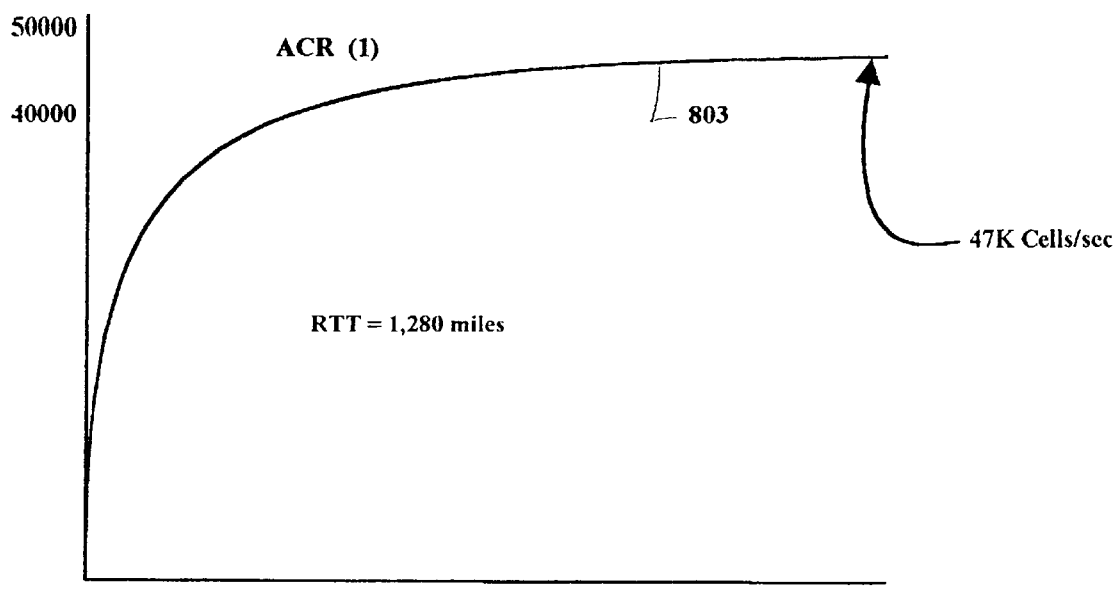
FIG. 8 is a graph illustrating transmission rate variations of allowable cell rate (ACR) for an exemplary data transmission session having a fixed "Nrm" value on an ATM network where the round trip time (RTT) is 1,280 miles.
Figure 9:
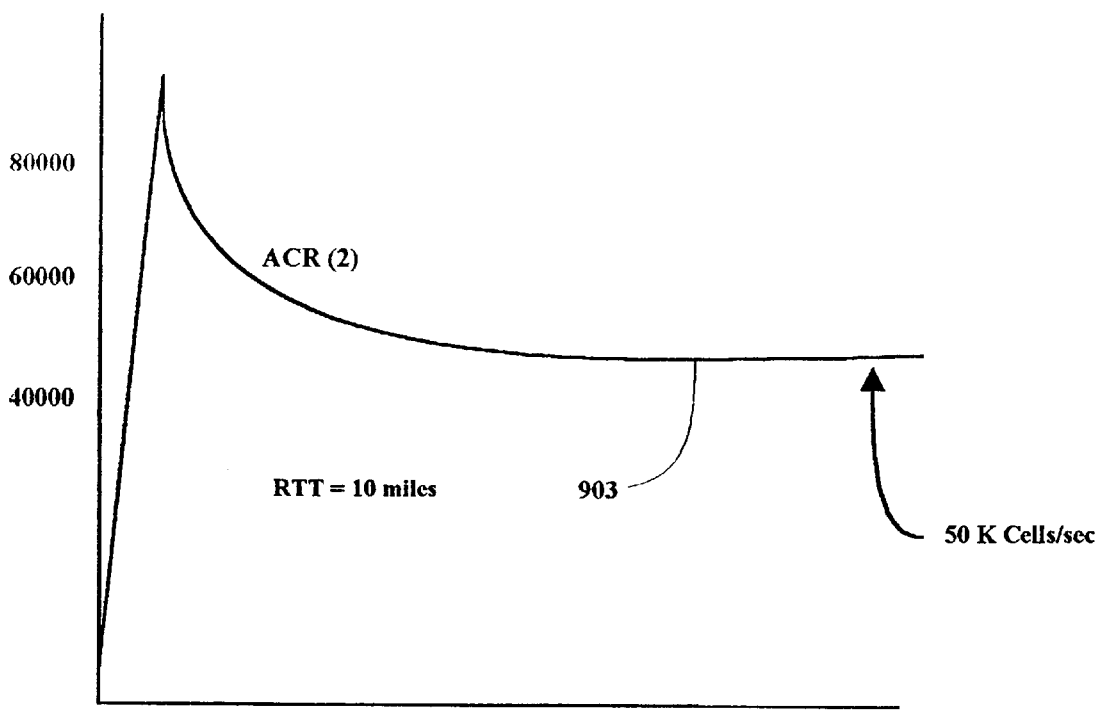
FIG. 9 is a graph illustrating transmission rate variations relative to an allowable cell rate for an exemplary data transmission session having a fixed "Nrm" value on an ATM network where the RTT is 10 miles.

The fairness problem in the ATM Forum ABR scheme is depicted in FIG. 8 and FIG. 9. The configuration of the network in the example is assumed to consist of two sessions, session #1 having a source to destination distance of D1, {S1,D1}, and session #2 having a source to destination distance of D2 {S2,D2}, with both sessions traversing a common switch with corresponding RTT values equal to 1,280 miles and 10 miles, respectively. The link capacity is 45 Mb/s or 106,132 cells/sec. All other ABR parameters are set the same for both sessions. As can be seen, for the transfer covering 1,280 miles in the present example, an average cell rate ACR(1) (about which switching rates may vary) is approximately 47K cells per second 803, while for the transfer covering only ten miles, an average cell rate ACR(2) is approximately 50K cells per second 903. The difference of 3K cells per second is significant. Ideally, ACR(1) and ACR(2) should have similar behavior. However, as hereinbefore noted, an "unfairness" in bandwidth allocation due to the disparity in RTT is introduced which causes average ACR(2) values to be somewhat higher than average ACR (1) values as illustrated. Moreover, when session {S1,D1} has a larger Nrm value, the unfairness in bandwidth allocation is even worse than that illustrated in FIG. 8 and FIG. 9.

Figure 10:
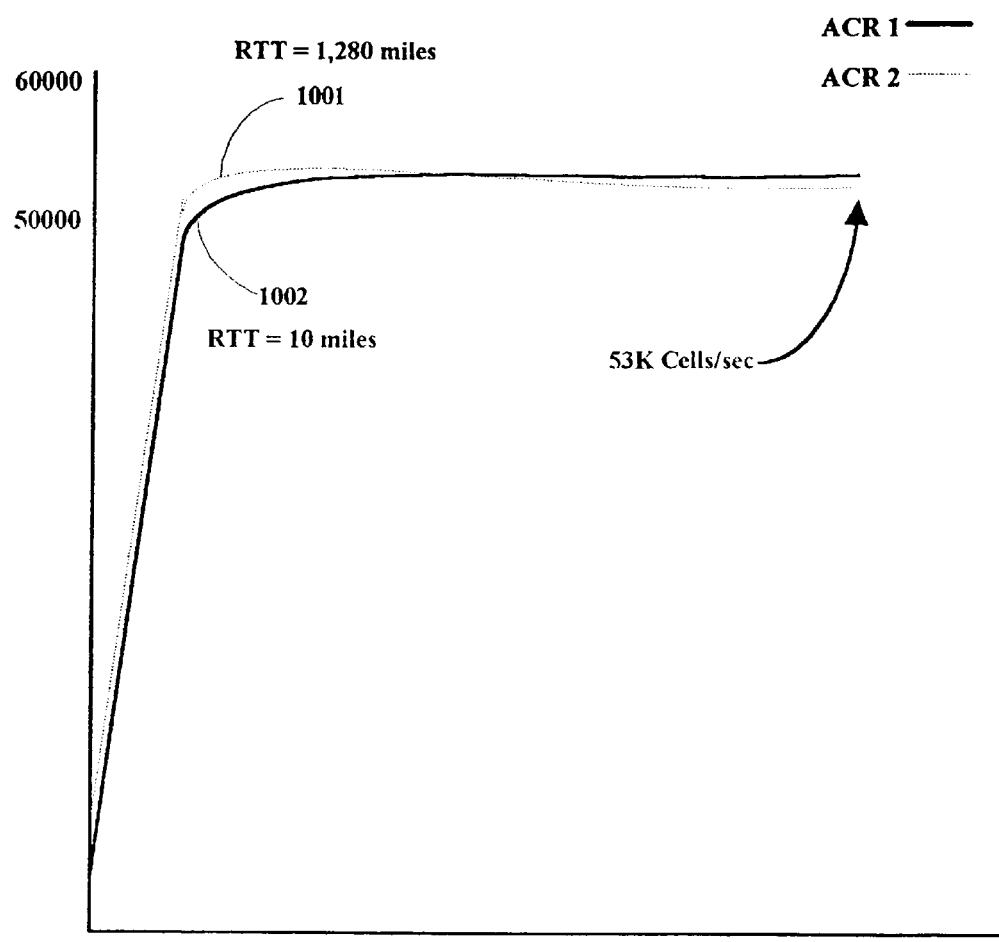
FIG. 10 is a graph illustrating transmission rate variations for a first session having an RTT of 1,280 miles and a second session having an RTT of ten miles, where inter-RM cell times Nrm(1) and Nrm(2) for both sessions are varied to match a predetermined sampling period.

The allocation fairness problem is solved by normalizing the Nrm value to ensure that the inter-RM cell times for all sessions are fixed at a predetermined time interval. The selection of the predetermined time interval value is a trade-off between network overhead and the responsiveness of the traffic source to network congestion. The predetermined time interval is a function of link speed, buffer size and "burstiness" level of real time traffic sources. FIG. 10 shows the allowable cell rate for sessions {S1,D1} and {S2,D2} when the value of Nrm is normalized to the allowable cell rate. In other words, the inter-RM cell time is fixed at 50 ms in the example, regardless of rate and RTT. As illustrated, the average transfer rates for both exemplary sessions are optimized, both around 53K cells per second in the present example, when the inter-RM cell time is determined or fixed independently of rate or RTT.

Figure 11:
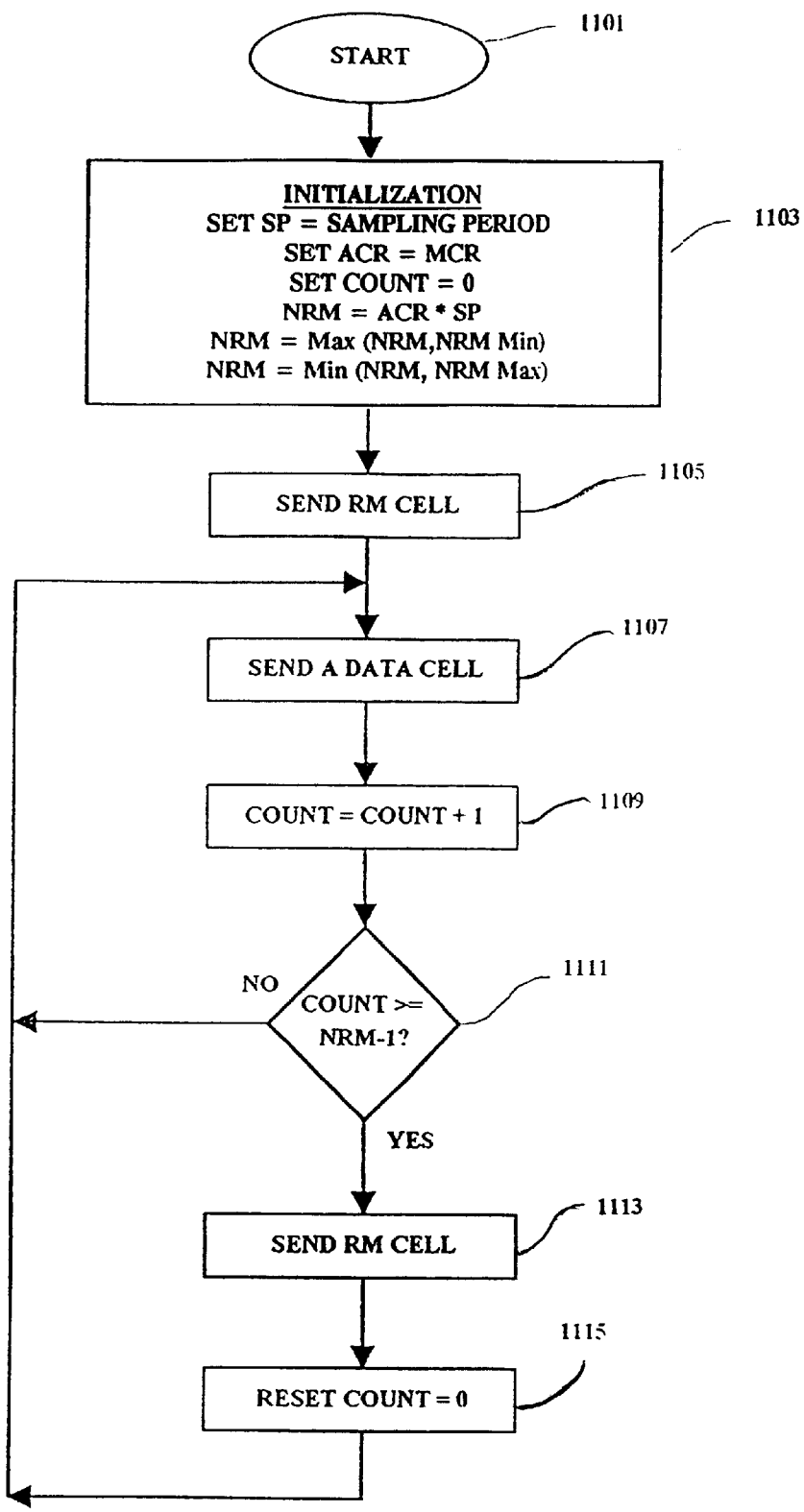
FIG. 11 is a flow chart illustrating the sending process at a data transmission source.

FIG. 11 shows a flow chart illustrating the sending process at a data transmission source 14. In the present example, as a transmission is started 1101, an initialization process 1103 sets the sampling period SP. Also, the ACR is set to a minimum cell rate (MCR), a reference count is set to zero and the Nrm parameter is set to a value equal to the product of the MCR and the sampling period SP. After initialization 1103, an RM cell is sent 1105 from the source, and the RM cell is followed by a data cell 1107. The count is incremented by "1" 1109, and it is determined 1111 whether or not the new count is greater than or equal to "Nrm−1". If not, another data cell is sent 1107 and the process repeats until the new count is greater than or equal to "Nrm−1". When that occurs 1111, the next RM cell is sent 1113 from the source and the count is reset to "0" 1115. A data cell is sent next 1107 as the process continues until all of the data cells have been transmitted.

Figure 12:
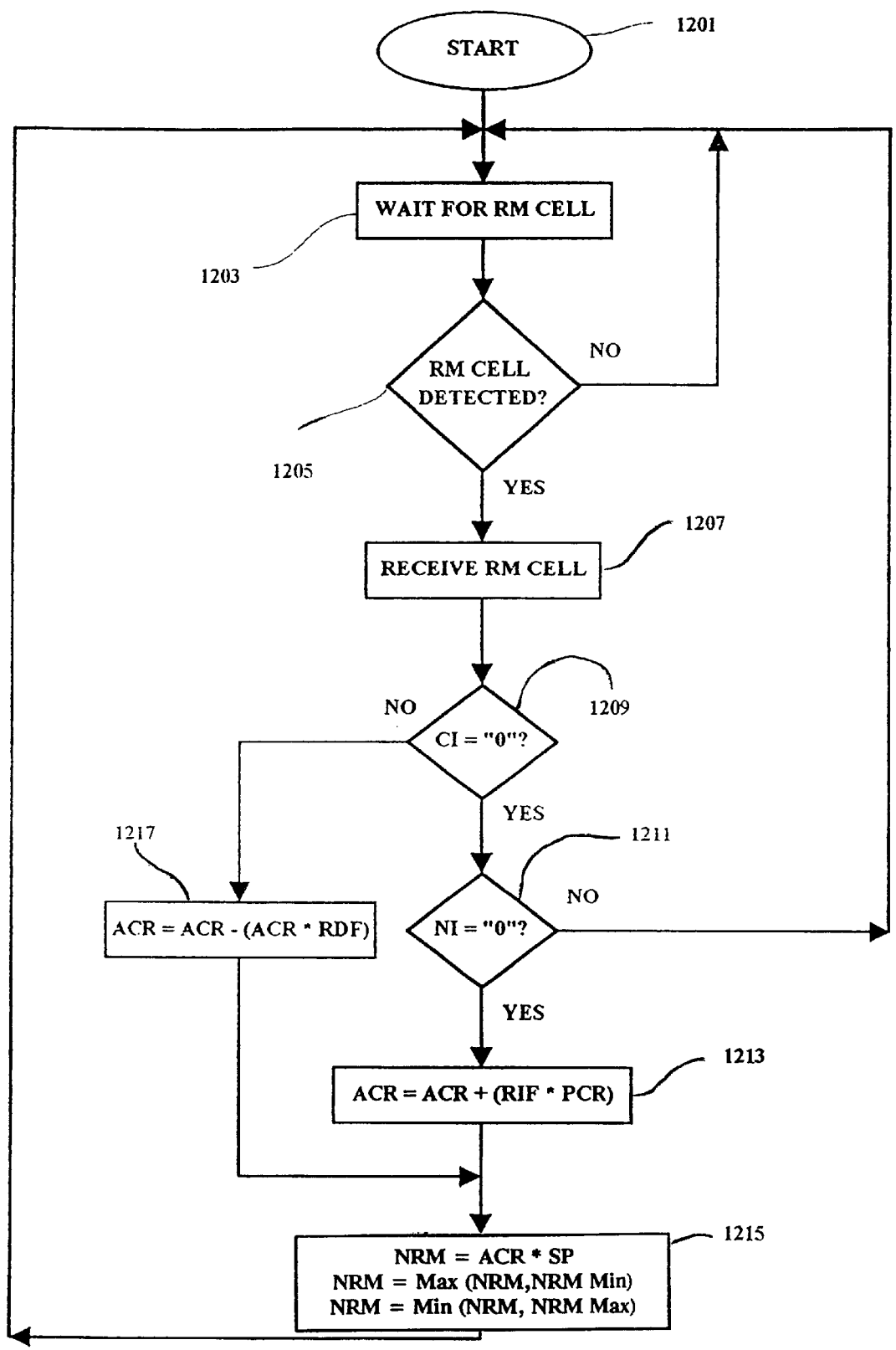
FIG. 12 is a flow chart illustrating the receiving process at the data transmission source.

As shown in FIG. 12, as the receiving process at the data transmission source 14 begins 1201, the source waits for a returned RM cell 1203. When an RM cell is detected 1205, the RM cell is received 1207 and the CI field is checked 1209 to determine the status of the CI field. If CI does not equal "0", then the ACR is reduced 1217 to a value equal to the previous ACR value less the product of the ACR and a Rate Decrease Factor RDF. At that time, the Nrm is set to the ACR times the sampling period SP 1215 and the process waits for the next RM cell 1203. If the CI field was equal to "0" 1209, then the NI field is checked 1211. If the NI field is equal to "0", then the ACR is increased 1213 to a value equal to the previous ACR plus the product of a Rate Increase Factor (RIF) and the Peak Cell Rate (PCR), the Nrm is set to the product of the ACR and the sampling period SP 1215, and the process waits for the next RM cell 1203. In the event the NI field of an RM cell does not equal "0" 1211, the process returns directly to await the next RM cell 1203. Note that Nrm is bounded from below and above by Nrm Min and Nrm Max. When the ACR is very low, Nrm Min ensures that the overhead of RM cells is maintained at an acceptable level. When the ACR is very high, Nrm Max ensures that the value of Nrm remains within bounds maintaining acceptable sensitivity.

The method and apparatus of the present invention has been described in connection with a preferred embodiment as disclosed herein. Varied embodiments that incorporate the teachings of the invention may be easily constructed by those skilled in the art, and even included or integrated into a processor or CPU or other larger system integrated circuit or chip. The methodology may also be implemented partially or solely in program code which may be executed to function as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. For use with a data transfer network wherein a source node is arranged for sending data cells and management cells at a variable source cell rate to at least one destination node, a method for transmitting data cells comprising:

determining a time interval;

sending a first management cell from the source node to the destination node;

sending a first number of data cells from said source node following said first management cell;

sending a second management cell after the first number of data cells, the first number of data cells selected in response to the source cell rate at which cells are permitted to be transmitted from the source node; and varying the first number of data cells with the source cell rate in a manner such that said time interval between the first management cell and the second management cell is substantially fixed and does not vary with the source cell rate.

2. The method as set forth in claim 1 wherein said network comprises at least first and second destination nodes located at first and second distances, respectively, from said source node.

3. The method as set forth in claim 1 and further comprising: modifying said source cell rate in response to predetermined network traffic conditions.

4. The method as set forth in claim 3 wherein said management cells contain traffic fields, said traffic fields including information representative of said predetermined network traffic conditions, said method further comprising:

modifying said traffic fields within said management cells to provide modified management cells by nodes within said network; and receiving said modified management cells by said source node, said modifying of said source cell rate being accomplished in accordance with said information within said traffic fields.

5. A method for transmitting information cells from a source node within a network, said method comprising:

transmitting a series of information cells from said source node, said information cells including data cells and transmission management cells; and determining a number of data cells transmitted between successive ones of said transmission management cells, the number of cells selected in response to a source cell rate at which cells may be transmitted from the source node, wherein the number of cells vary with the source cell rate in a manner such that a time interval between successive ones of said transmission management cells is substantially fixed and does not vary with the source cell rate.

6. The method as set forth in claim 5 wherein said network comprises at least first and second destination nodes located at first and second distances, respectively, from said source node.

7. The method as set forth in claim 5 and further comprising:

modifying said source cell rate in response to predetermined network traffic conditions.

8. The method as set forth in claim 7 and further comprising:

determining a new number of data cells transmitted between successive ones of said transmission management cells whenever said source cell rate is modified.

9. The method as set forth in claim 8 wherein said transmission management cells contain traffic fields, said traffic fields including information representative of said predetermined network traffic conditions, said method further comprising:

modifying said traffic fields within said transmission management cells to provide modified transmission management cells by nodes within said network; and receiving said modified transmission management cells by said source node, said modifying of said source cell rate being accomplished in accordance with said information within said traffic fields.

10. A source node device for use in a data transfer system said source node device comprising:

data transmitting means arranged to be selectively operable for transmitting a series of information cells from said source node device, said information cells including data cells and transmission management cells, said information cells being transmitted at a source cell rate; and processing means coupled to said data transmitting means, said processing means being arranged for determining a number of data cells transmitted between successive ones of transmission management cells, the number of cells selected in response to a source cell rate at which cells are permitted to be transmitted from the source node, wherein the number of cells vary with the source cell rate in a manner such that a time interval between successive ones of said transmission management cells is substantially fixed and does not vary with the source cell rate.

11. A method for determining a number of data cells to transmit after transmission of a first management cell and before transmission of a second management cell, by a source node sending data cells and management cells onto a data transfer network to a plurality of destination nodes, said source node using a potentially different transmittal rate for each said destination node of said plurality of destination nodes, comprising:

a) determining a time interval;
b) selecting a particular destination node of said plurality of destination nodes;
c) sending a first management cell from said source node to a said particular destination node;
d) sending a first number of data cells from said source node following said first management cell to said particular destination node, said first number calculated as a product of said time interval and a first cell transmittal rate used for transmitting cells to said particular destination node;
e) sending a second management cell to said first destination node after said first number of data cells is sent;
f) completing steps b–e for each of said destination nodes, where said product is computed for each said destination node using said time interval and a transmission rate used for transmission of cells to said each of said destination nodes.

12. The method as in claim 11 further comprising:

identifying said "a first number of data cells from said source node following said first management cell to said particular destination node, said first number calculated in relation to a number of cells calculated by a product of said time interval and a first cell transmittal rate used for transmitting cells to said particular destination node" as a standard ATM parameter "Nrm".

13. The method of claim 12 further comprising:

re-calculating said Nrm parameter for a particular destination node of said plurality of destination nodes when said source node changes a value of transmission rate for said particular destination node.

14. A method for determining a number of data cells to transmit after transmission of a first management cell and before transmission of a second management cell, by a source node sending data cells and management cells onto a data transfer network to a plurality of destination nodes, said source node using a potentially different transmittal rate for each said destination node of said plurality of destination nodes, comprising:

a) determining a time interval;
b) sending a first management cell from said source node to a first destination node of said plurality of destination nodes;
c) sending a first number of data cells from said source node following said first management cell to said first destination node, said first number calculated in relation to a number of cells calculated by a product of said time interval and a first cell transmittal rate used for transmitting cells to said first destination node;
d) sending a second management cell to said first destination node after said first number of data cells is sent; and,
e) completing steps b–d for each of said destination nodes.

15. A method for varying the source cell transmittal rate by a source node sending data cells and management cells onto a data transfer network to at least one destination node, comprising:

a) determining a time interval;
b) sending a first management cell from said source node to said destination node;
c) sending a first number of data cells from said source node following said first management cell, said first number calculated in relation to a number of cells calculated by a product of said time interval and a first cell transmittal rate;
d) sending a second management cell after said first number of data cells is sent; and,
e) repeating steps b–d for each destination node of said plurality of destination nodes.

16. A source node in a data transfer network comprising:

a central processing unit (CPU) for determining a number of data cells to transmit after transmission of a first management cell and before transmission of a second management cell, by a source node sending data cells and management cells onto a data transfer network to a plurality of destination nodes, said source node using a potentially different transmittal rate for each said destination node of said plurality of destination nodes;

a memory for storing a time interval;

a cell I/O handler to select a particular destination node of said plurality of destination nodes, said cell I/O handler sending a first management cell from said source node to a said particular destination node;

an output buffer to send a first number of data cells from said source node following said first management cell to said particular destination node, said source node calculating said first number in relation to a number of cells calculated by a product of said time interval and a first cell transmittal rate used for transmitting cells to said particular destination node, and said source node sending a second management cell to said first destination node after said first number of data cells is sent, and said source node completing steps b–e for each of said destination nodes, where said product is computed for each said destination node using said time interval and a transmission rate used for transmission of cells to said each of said destination nodes.

17. A method for transmitting data cells in a computer network, comprising:

establishing a time period;

establishing a plurality of sessions for transmitting the data cells;

computing a first number of data cells as a product of said time period and a transmission rate for a first session of said plurality of sessions;

transmitting, in said first session, a first management cell followed by said first number of data cells followed by a second management cell;

computing a second number of data cells as a product of said time period and a transmission rate for a second session of said plurality of sessions; and, transmitting, in said second session, a third management cell followed by said second number of data cells followed by a fourth management cell.

18. The method as in claim 17, further comprising:

modifying a transmission rate of a session in response to reading a transmission rate from a received backward explicit notification management cell.

19. The method as in claim 17, further comprising:

modifying a transmission rate written into a backward explicit notification management cell transmitted by an intermediate node in a computer network in response to congestion conditions experienced by said node.

20. The method as in claim 17, further comprising:

modifying a transmission rate of a session in response to reading a current cell rate (CCR) field in a received backward explicit notification management cell.

21. The method as in claim 17, further comprising:

modifying a transmission rate of a session in response to reading an explicit rate (ER) field in a received backward explicit notification management cell.

22. The method as in claim 17, further comprising:

choosing said first session and said second session so that a first return time of a reverse management cell in said first session is longer than a second return time of a reverse management cell in said second session.

23. The method as in claim 17, further comprising:

computing a number of data cells to transmit before transmitting another management cell using the relationship:

$$N=R*T$$

where T represents said time period, where R represents a transmission rate in a selected session, and where N represents said number of data cells to transmit before transmitting another management cell in said selected session.

24. A node in a computer network, comprising:

a data processing control system to establish a plurality of sessions for transmitting a plurality of data cells in each of a plurality of sessions;

a central processing unit in said data processing control system to establish a time period,
  compute a first number of data cells as a product of said time period and a transmission rate for a first session of said plurality of sessions,
  compute a second number of data cells as a product of said time period and a transmission rate for a second session of said plurality of sessions;

a transmitter to transmit in said first session, a first management cell followed by said first number of data cells followed by a second management cell, and to transmit in said second session, a third management cell followed by said second number of data cells followed by a fourth management cell.

25. The node as in claim 24, further comprising:

said data processing control system modifying a transmission rate of a session in response to reading a transmission rate from a received backward explicit notification management cell.

26. The node as in claim 24, further comprising:

said data processing control system reading a transmission rate, said transmission rate written into a backward explicit notification management cell transmitted by an intermediate node in a computer network, said transmission rate written in response to congestion conditions experienced by said intermediate node.

27. The node as in claim 24, further comprising:

said data processing control system modifying a transmission rate of a session in response to reading a current cell rate (CCR) field in a received backward explicit notification management cell.

28. The node as in claim 24, further comprising:

said data processing control system modifying a transmission rate of a session in response to reading an explicit rate (ER) field in a received backward explicit notification management cell.

29. The node as in claim 24, further comprising:

said data processing control system choosing said first session and said second session so that a first return time of a reverse management cell in said first session is longer than a second return time of a reverse management cell in said second session.

30. The method as in claim 24, further comprising:

said data processing control system computing a number of data cells to transmit before transmitting another management cell using the relationship:

$$N=R*T$$

where T represents said time period, where R represents a transmission rate in a selected session, and where N represents said number of data cells to transmit before transmitting another management cell in said selected session.

31. A node in a computer network, comprising:

means for establishing a plurality of sessions, and for transmitting a plurality of data cells in each of said plurality of sessions;

means for establishing a time period;

means for computing a first number of data cells as a product of said time period and a transmission rate for a first session of said plurality of sessions;

means for computing a second number of data cells as a product of said time period and a transmission rate for a second session of said plurality of sessions; and, a transmitter to transmit in said first session, a first management cell followed by said first number of data cells followed by a second management cell, and to transmit in said second session, a third management cell followed by said second number of data cells followed by a fourth management cell.

32. A computer readable media comprising:

said computer readable media having instructions written thereon for execution in a processor to practice the method of claim 1 or claim 5 or claim 11 or claim 14 or claim 15 or claim 17.

33. Electromagnetic signals propagating on a computer network, comprising:

said electromagnetic signals carrying instructions for execution in a processor to practice the method of claim 1 or claim 5 or claim 11 or claim 14 or claim 15 or claim 17.

* * * * *